United States Patent [19]
Elstone

[11] Patent Number: 5,947,312
[45] Date of Patent: Sep. 7, 1999

[54] REUSABLE CONTAINER SYSTEM

[76] Inventor: Paul Elstone, 420 Main St., Medford, N.J. 08055

[21] Appl. No.: 08/982,787

[22] Filed: Dec. 2, 1997

[51] Int. Cl.[6] .................................................. B65D 88/28
[52] U.S. Cl. .............................. 220/1.5; 220/6; 220/4.09; 220/4.16; 220/4.29; 220/495.11
[58] Field of Search .................................... 222/574, 525, 222/181.1, 185.1, 460, 461, 462; 220/6, 7, 571, 1.5, 4.11, 4.09, 4.16, 4.28, 4.29, 495.01, 495.06, 495.11, 62

[56] References Cited

U.S. PATENT DOCUMENTS

| | | |
|---|---|---|
| 3,318,473 | 5/1967 | Jones et al. . |
| 3,975,179 | 8/1976 | Fischer . |
| 4,221,296 | 9/1980 | Fell et al. . |
| 4,240,565 | 12/1980 | Croley . |
| 4,247,021 | 1/1981 | Reiner et al. . |
| 4,397,406 | 8/1983 | Croley . |
| 4,492,153 | 1/1985 | Grabowski . |
| 4,511,080 | 4/1985 | Madsen et al. . |
| 4,585,143 | 4/1986 | Fremow et al. . |
| 4,630,746 | 12/1986 | Fortenberry ................................. 220/6 |
| 4,742,951 | 5/1988 | Kelly et al. . |
| 4,817,824 | 4/1989 | LaFleur et al. . |
| 4,828,132 | 5/1989 | Francis, Jr. et al. ......................... 220/6 |
| 4,860,912 | 8/1989 | Kupersmit . |
| 4,927,026 | 5/1990 | Gossler et al. . |
| 5,178,275 | 1/1993 | Fitzberald et al. . |
| 5,253,763 | 10/1993 | Kirkley et al. . |
| 5,269,414 | 12/1993 | D'Hollander . |
| 5,323,956 | 6/1994 | Marcontell . |
| 5,441,154 | 8/1995 | Youell, III . |
| 5,507,392 | 4/1996 | Schutz . |
| 5,533,666 | 7/1996 | Cromwell . |

*Primary Examiner*—Stephen Castellano
*Attorney, Agent, or Firm*—Walter J. Tencza, Jr.

[57] ABSTRACT

A reusable container system is disclosed including a folding sleeve selectively engaged to a rigid base. The rigid base includes a concave top surface with a top opening and a bottom opening. Legs are mounted to the base and extend downward toward the bottom opening. Tubes adapted to receive the prongs of a forklift are mounted to the legs. The sleeve is composed of a first side member hingedly attached to a second side member. Each side member includes a plurality of rigid plates connected by external hinges. The side members are attached to each other by internal hinges. The sleeve can be moved from an open position in which a cavity is formed inside the sleeve, to a closed position, in which the plates lie adjacent. In the closed position, the sleeve and entire container system takes up substantially less space and can be more easily stored and transported.

13 Claims, 4 Drawing Sheets

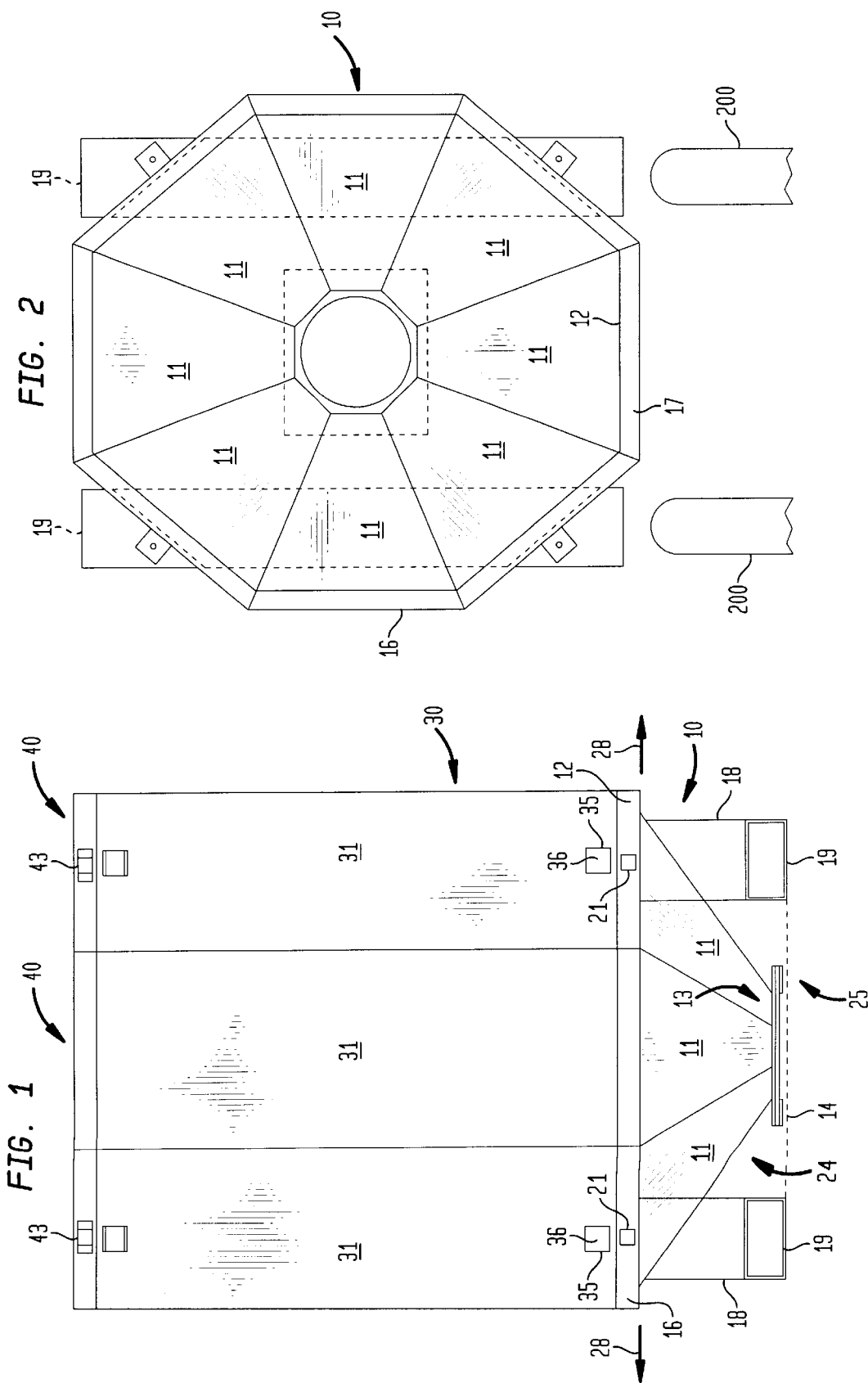

REUSABLE CONTAINER SYSTEM

BACKGROUND OF THE INVENTION

This invention is directed to the field of shipping, storage and delivery of bulk materials. In particular, the invention is directed to a container for storing bulk materials which is capable of being stacked while filled with the very dense bulk materials and then disassembled for convenient storage and return shipping when not filled with bulk materials.

Bulk materials, such as iron powder and the like, often must be shipped from one location to a remote location. The shipping of these materials creates unique difficulties because they are very dense and thus require a very strong container. Further, due to the small size of the discreet elements of the material, they effectively "flow" which can result in leakage and loss of the material. This is of particular concern since the bulk materials are often costly.

Typically, bulk materials are shipped in cardboard containers having an octagonal profile. The containers lack adequate structural stability and thus metal bands are required to insure the integrity of the container once filled. This is particularly true since the bending corners of the containers are integrally formed with the side walls. They are made of the same material. Thus, the side walls are made of a flexible material, reducing its structural strength. Once the containers are filled with the bulk material, they are loaded onto a truck or train car. The filled containers are placed on a wooden pallet which, in turn, is lifted and moved by a forklift. There is some risk that, during moving, the container will fall off the pallet. Of course, the container could be secured to the pallet using straps and the like but this would require additional man-hours (and the attendant costs) to ensure it is done properly. Even if secured, this technique requires the use of large numbers of wooden pallets which can be costly and are susceptible to breaking, especially under the heavy load of a filled container.

Storage space in a truck or train is at a premium. Consequently, it is important that the bulk-filled containers be packed together tightly. The large pallets limit how closely the containers can be loaded. Even with the metal bands, the cardboard containers are not strong enough to be stacked one on top of the other. Further, should one of the containers tip over, the sides can be easily punctured allowing material to escape. Once used, the cardboard containers are thrown away, creating a large amount of waste. Thus, the current cardboard containers have been found to be unacceptable for numerous reasons.

Various containers have been developed over the years in an effort to address these problems. U.S. Pat. No. 4,742,951 is directed to a container for bulk flowable materials. An octagonal-shaped cardboard sleeve is attached to a bottom end cap. The adjacent panels of the sleeve are connected along elongate edges. A tubular inner member which is designed to withstand the pressure of the contained material is inserted inside the octagonal sleeve. A top end cap is attached to the top of the sleeve.

U.S. Pat. No. 4,927,026 is directed to pallet box. Side walls of a container are hinged to the surface of a pallet. A tubular cardboard sleeve is positioned about the side walls and maintains the container shape. The container can be formed by criss-crossing panels attached to the pallet.

U.S. Pat. No. 5,178,275 is directed to an eight-sided columnar container for supporting bulk materials in sacks. An eight-sided collapsible sleeve is mounted to a pallet. Tabs are positioned along the bottom edge of each side of the container. Alternating tabs are bent inward or outward. The sacks of materials are disposed within the sleeve and a cap may be positioned on top of the sleeve.

U.S. Pat. No. 5,441,154 is directed to a integrated paperboard container and pallet system. The wall portion of the container has a polygonal-shaped interior cavity. At least one tab is formed at the bottom of one of the walls. The deck portion has a planar member with an upper side forming a floor surface and a lower side forming a support surface. Edges are mounted to the planar member and have the same polygonal shape as the wall portion. Openings are positioned in the planar member to receive any tabs. The planar member is designed to be mounted to a pallet, if desired. The wall portion can be folded when it is not attached to the planar member.

U.S. Pat. No. 4,511,080 is directed to interlocking end closure flaps on collapsible eight-sided receptacle. The receptacle is formed of a single blank of foldable sheet material. The flaps positioned along the bottom edges of the receptacle fold over to form the bottom of the container.

U.S. Pat. No. 5,269,414 is directed to an intermediate bulk container. The side walls of the container are made of a rigid material and are hinged to the base using one- or two-directional hinges. Sealing strips or separate bags are provided to prevent any leaking of material through the hinge. The bottom panel of the container may be ramped to direct the flow of material from the container. A cutting means can be provided at the exit of the container to allow for opening any internal bag holding the material.

U.S. Pat. No. 5,253,763 is directed to a collapsible container. The walls of the container are mounted by long, horizontal hinges attached to the walls. This container can be palletized.

U.S. Pat. No. 5,507,392 is directed to a pallet container with adapter frame. A hinged support insert is provided that folds upon itself using both internal and external hinges. The container may be provided with a plastic, sloped bottom.

None of these patents fully address the problems resolved by the instant invention.

SUMMARY OF INVENTION

It is an object of an aspect of the instant invention to provide a bulk materials container which can be disassembled after use and folded into a space-saving configuration for later use.

It is another object of an aspect of this invention to provide a bulk materials container which can be stacked for efficient storage and transportation.

It is another object of an aspect of this invention to provide a bulk materials container which allows access to the bulk materials from the bottom and directs the flow of the bulk materials to the opening.

It is another object of an aspect of this invention to provide a bulk materials container system which can be reused multiple times despite heavy cargo weights and rough handling.

In accord with one aspect of the invention, a container is provided for storing and transporting bulk solid materials. The container includes a rigid base having a concave top surface with a polygonal periphery and a bottom opening. A sleeve having an interior and an exterior is selectively and releasably engaged to the base. The sleeve comprises a first side member having two side ends and having a selected number of rigid structural plates connected by external hinges. The sleeve also includes a second side member having two side ends and having another selected number of rigid structural plates as the first side member. The structural plates of the second side member are connected by external hinges. The first side member and the second side member are connected along both of their inside ends by internal hinges, thus forming the sleeve. The sleeve can be moved from an open position in which the rigid structural plates are separated to form a cavity between the rigid structural plates, to a folded position in which the structural plates of the first side member are adjacent the structural plates of the second side member. The sleeve fits snugly within the periphery of the base when the sleeve is in the open position.

In accord with another aspect of the invention, a container is provided for the storage and shipping of bulk solids. The container includes a base having an octagonal profile and including eight panels connected to form an inverted pyramid with a top and a bottom. The top of the base is in a top plane. A shelf is fixedly mounted to the base at the top. A rigid ledge having eight sides, a band shape and a selected height is fixedly connected to and surrounds the top of the base. Legs are attached to the base and extend a fixed distance from the base. Tubes are fixedly mounted to the legs distal to the base and extend parallel to the top plane. The panels are connected to form a lower opening at the bottom of the base. A door having a lead edge is slidingly mounted to the base at the bottom. The door is movable from a first position in which the door covers the lower opening to the second position in which the lower opening is exposed. A sleeve is formed by a series of eight rigid structural plates. The bottom edges of the structural plates are disposed on the shelf along the ledge. Each structural plate is attached to two adjacent structural plates by hinges. The hinges are grouped in order as follows: at least one external hinge, at least one internal hinge, at least one external hinge, and at least one internal hinge. Means for selectively engaging the rigid plates to the ledge are provided.

In accord with another aspect of the invention, a container is provided for storing bulk materials. A base includes a top opening and a bottom. A sleeve having an interior and an exterior is selectively mounted to the base about the top opening. The sleeve is formed by a plurality of rigid plates. Adjacent plates are connected by hinges. The sleeve can be moved from an open position in which the rigid plates are separated to form a cavity and a seam is formed between adjacent plates, to a folded position in which the plates lie adjacent. Each plate has a first side edge, a second side edge, a top edge and a bottom edge. The first edge of a first plate is hinged to a second edge of a second plate. At least two of the hinges are disposed in the interior of the sleeve and two hinges are disposed at the exterior of the sleeve.

The material for the plates is selected such that the sleeve has adequate structural integrity to support the weight of a second, loaded container placed on top of the sleeve, as well as to contain the dense material within the sleeve during transport.

BRIEF DESCRIPTION OF THE DRAWINGS

FIG. 1 is a side elevation view of the container of the current invention.

FIG. 2 is a top elevation view of a base for use with the container of FIG. 1.

DESCRIPTION OF PREFERRED EMBODIMENTS

Figure 3:
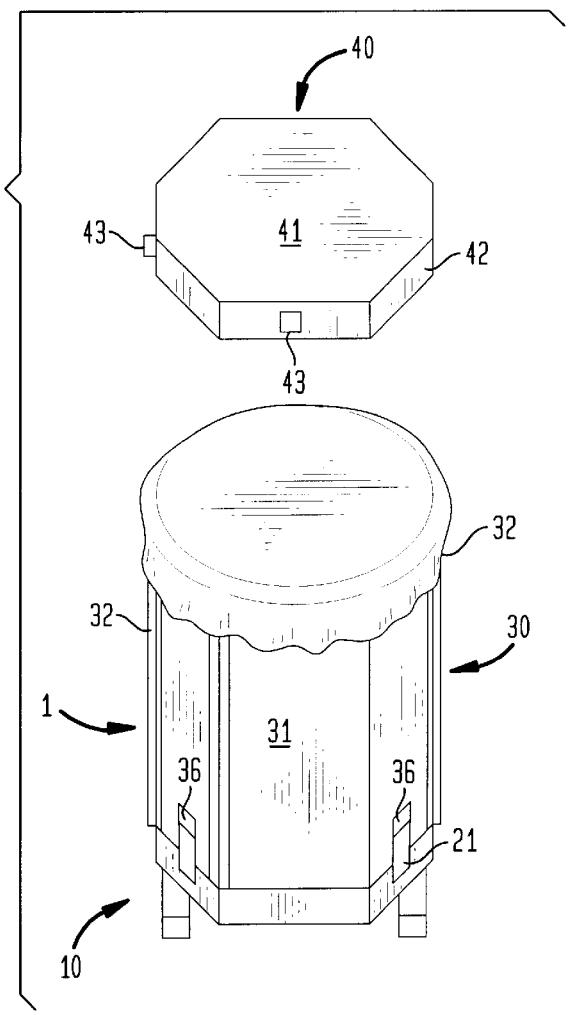
FIG. 3 is a front perspective view of the container of FIG. 1 including a removable liner.

Referring to FIGS. 1 and 3, a container 1 for the storage, shipping and delivery of bulk materials is depicted. Typical bulk materials include iron powder and the like. The container 1 includes a base 10 selectively engaged to a sleeve 30. The top of the sleeve can be closed with a lid 40. The base, sleeve and lid are all made of a strong rigid material, such as a heavy gauge plastic, steel, aluminum or other structural material. Such material should have adequate tensile strength and compressive strength to contain the dense bulk material without bowing and to support a second container also filled with very dense materials. Further, the container material should be puncture resistant to prevent any damage or material loss should the container contact a sharp object or fall over. As discussed below, the base, sleeve and lid can be disassembled and folded away for easy storage or transportation.

Referring to FIGS. 1 and 2, the base 10 has a polygonal profile. As most preferred, the polygon is an octagon. Eight panels 11 having a trapezoidal shape are connected to form an inverted pyramid 24 with a top opening 12 and a bottom opening 13. This concave top surface 111 of the pyramid leads from the top opening to the bottom opening. The top opening is in a top plane 28. Preferably, the panels 11 are connected in sealed engagement, such as by welding. Of course, other techniques for forming the base 10 could also be employed, such as by forming the pyramid from a single, integrally-formed piece. Further, the concave surface could be formed by a smooth curve, thus having a conical or funnel shape.

A horizontal shelf 17 is mounted to the panels near the top opening 12 and is disposed in the top plane 28. A vertical ledge 16 having a band shape and a polygonal profile to match the base 10 is attached to the periphery of the shelf. Preferably the ledge, shelf and panels are all welded together or integrally formed. For example, the ledge, shelf and panels can be stamped from a single sheet, if desired.

Legs 18 are fixedly attached to the base 10 and extend downward. Tubes 19 are attached to the legs distal to the base 10. Preferably, the tubes are parallel to each other and extend in a plane parallel to the top opening 12 of the base (i.e., parallel to the top plane 28). The tubes include channels which are sized to receive the prongs 200 of a forklift. It will be appreciated that other shapes, such as inverted U-shapes and the like, can be employed to engage the prongs of the forklift. The legs 18 and tubes 19 are sized such that the bottom opening 13 is slightly above the bottom of the tubes. In this way, the tubes (and thus the container 1) can be placed on a surface while the bottom opening 13 and door 15 (discussed below) are protected from exposure to the ground. Further, the door can be accessed without elevating the container.

Figure 7:
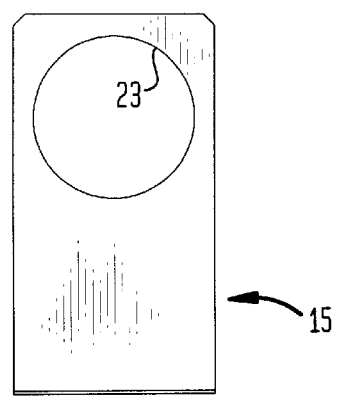
FIG. 7 is a top elevation view of a door for use with the container of FIG. 1.

Tracks 14 are fixedly mounted to the base 10 near the bottom opening 13. The door 15 is disposed in channels in the tracks and thereby slidingly mounted to the tracks. The door includes a door opening 23 at one end but is otherwise solid (see FIG. 7). The door can be moved along the track such that either the body of the door or the door opening 23 are aligned with the bottom opening 13. Alternatively, the door can be smaller such that it blocks the bottom opening or is moved to the side such that the bottom opening is exposed. In either event, the door can be used to direct or prevent flow of material from the container. Of course, other types of closures can be employed and practice the invention.

Figure 5:
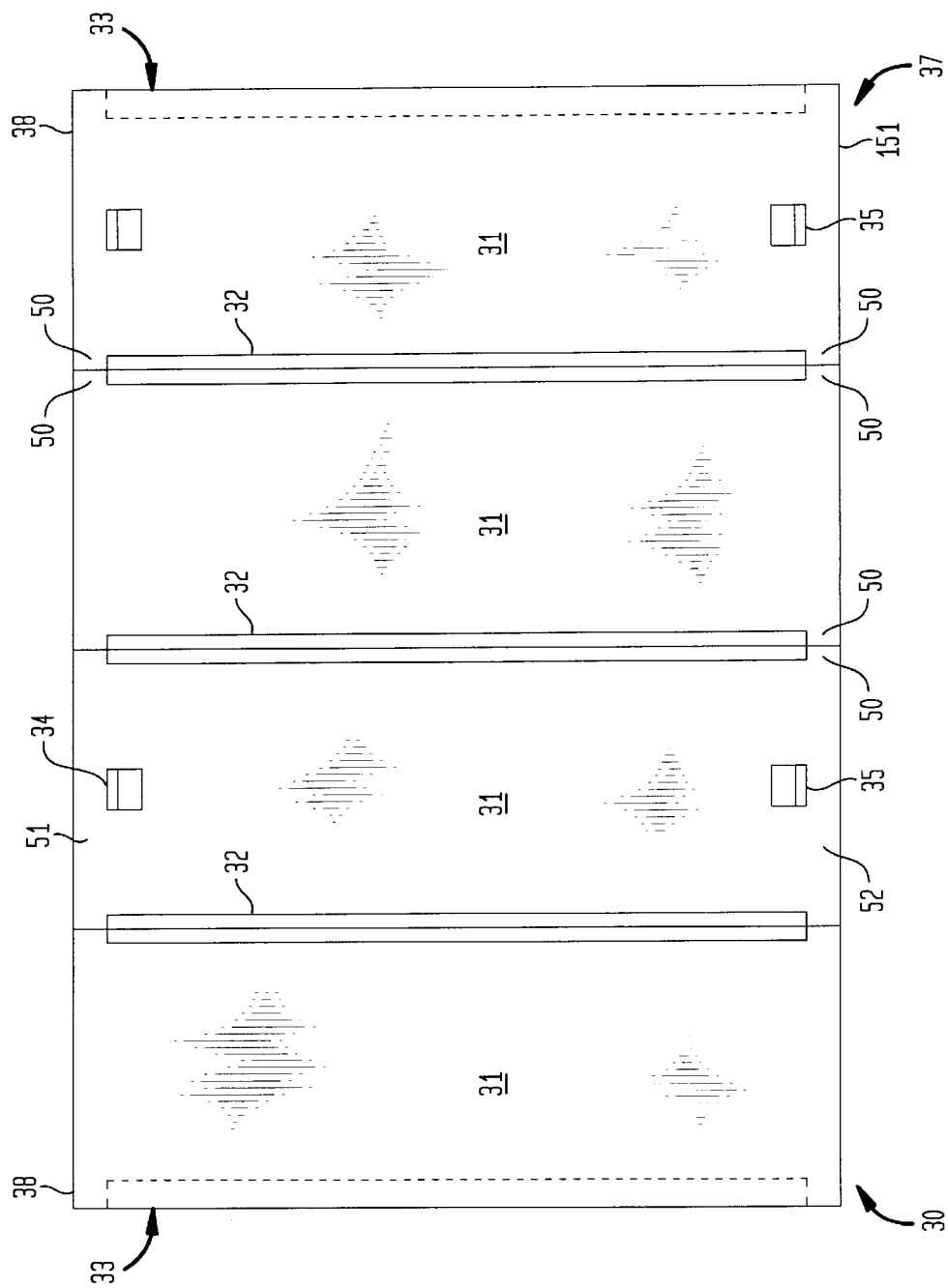
FIG. 5 is a side elevation view of the sleeve in FIG. 4 in the folded position.

Referring to FIGS. 1 and 5, the sleeve 30 is composed of two side members 37 connected at their side ends 38 by internal hinges 3. Each side member is composed of a series of four plates 31 connected by external hinges 32 as seen particularly in FIG. 5. Consequently, the sleeve is formed of eight distinct plates connected by hinges. To use the container, the sleeve is opened, thereby forming a cavity 230 between the side members. When not in use, the side members 37 can be folded together, reducing the overall space taken up by the sleeve. In particular, the internal hinges 33 can be folded closed while the external hinges 32 are opened fully, allowing the sleeve to be lain flat, as seen in FIG. 5. Preferably, the hinges are a distinct piece from the plates. In prior art systems, the hinge is often integrally formed with the plates which implies that the plates are made of a flexible material, which is not preferred.

Figure 4:
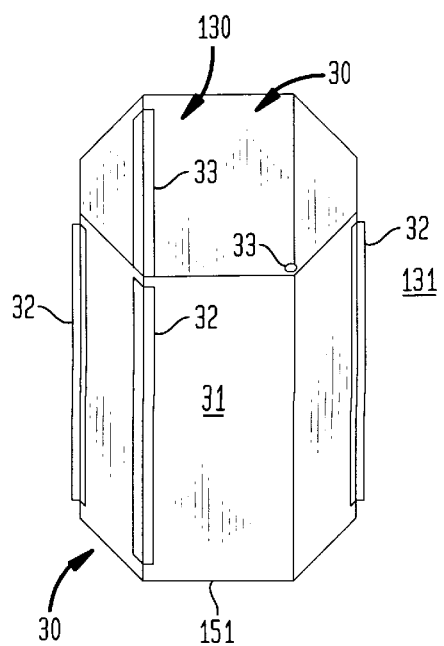
FIG. 4 is a front elevation view of a sleeve for use with the container of FIG. 1.
Figure 6:
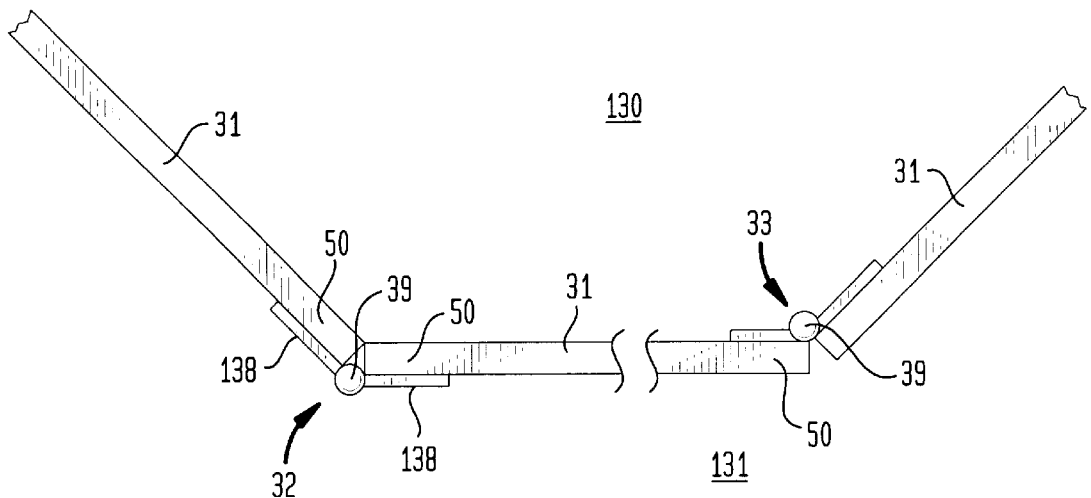
FIG. 6 is a top cut-away view of the container of FIG. 4.

The sleeve 30 comprises a series of a selected number of these plates 31, each plate having a rectangular shape and are formed of a strong, puncture-resistant, rigid structural material, such as steel, aluminum or hard plastic. Adjacent plates in the series are connected by hinges 32, 33. The external and internal hinges alternate around the sleeve: at least one external hinges, then at least one internal hinge, then at least one external hinge, then at least one internal hinge. Of course, more hinges of each type may be used in the series. In particular, as seen in FIGS. 4–6, the eight plates 31 are connected by six external hinges 32 and two internal hinges 33 to form the sleeve with an interior 130 and an exterior 131. The internal hinges are disposed at opposite corners of the sleeve. Three external hinges are disposed between each internal hinge around the sleeve. Consequently, the hinges are ordered: three external hinges, one internal hinge, three external hinges, one internal hinge.

As currently preferred, eight plates 31 are employed to form the sleeve 30. It will be appreciated that various numbers of plates and differing hinge arrangements can be employed and still practice the invention. In particular, any even number of plates can be used with internal hinges 33 separated by an equal number of plates. Further, different numbers of plates can be used so long as each side member includes a component that is the same length. The number of plates should be selected to match the number of sides on the polygonal profile of the base 10.

As seen in FIG. 6, each hinge 32, 33 includes two hinge plates 138 connected by a pivot 39. The first hinge plate is attached to a longitudinal edge 50 of one plate 31. The second hinge plate is attached to a longitudinal edge of the adjacent plate. Preferably, the hinges 32, 33 (and the hinge plate 138) extend substantially the entire length of the longitudinal edge. As currently preferred, piano hinges are used. It will be appreciated that other types of hinges can be employed and practice the invention.

Upper handles 34 and lower handles 35 are mounted to the plates 31 near the upper edges 51 and lower edges 52, respectively. Preferably, a cavity 36 is formed in the lower handle to receive a latch 21 (shown schematically) mounted to the base. It will be appreciated by one skilled in the art that other means can be used to selectively and releaseably secure the sleeve 30 to the base 10. For example, bolts, clips snaps, and the like can all be used and still practice the invention. Further, the sleeve can be friction fit into the ledge 16 of the base 10.

A lid 40 includes a top panel 41 surrounded by a top ridge 42. The top panel is shaped and sized to fit securely over the sleeve 30 while the sleeve is mounted to the base 10. Top latches 43 may be provided on the lid to engage the lid securely to the plates of the sleeve.

To use the container 1 of the current invention, the base 10 is positioned on a solid surface. The base is designed such that the bottom opening 13 and the door 15 are positioned above the bottom level 25 as defined by the bottom portion of the tube 19. In this way, the door is less likely to be damaged during transportation. Further, the door can be accessed even though the tubes are resting on the ground.

The folded sleeve 30 (as depicted in FIG. 5) is picked up by the handles 34, 35 and moved to a position over the base 10 such that the bottom edge 151 of the plates 31 are seated on the shelf 17. Pulling at the handles, the sleeve is opened (as depicted in FIG. 4) to fit snugly within the ledge 16 while resting on the shelf 17. A cavity 230 is thus formed between the plates 31. The lower latches 21 are then engaged to the cavities 36 in the lower handles 35. Consequently, the sleeve is secured to the base. Preferably, the latches are positioned at the corners (rather than the front and sides) of the base 10 (see FIG. 2) such that they are less likely to be damaged during use.

An optional flexible liner 210 may be provided in the container 1. The liner prevents any of the bulk material from leaking out between the plates 31 or between the plate and the base 10.

The plates 31 are separated by sufficient distance such that, when the sleeve 10 is in the open position, the adjacent plates abut (see FIG. 6). In this way, the plates form a relatively tight seam, substantially preventing material from leaking there between. The longitudinal edges may be beveled or provided with a gasket to create a tighter seal between adjacent plates, if desired. The internal hinges 33 themselves prevent bulk material from leaking between those plates.

Once assembled, the bulk material is then loaded into the flexible liner 210 and the lid 40 is positioned over the sleeve 30. Top latches 43 can be used to secure the lid in place. Due to the inherent strength of the plates 31 and the base 10 of the container 1, a second container loaded with bulk material may be positioned on top of the first container.

To move the loaded container 1 a short distance, the prongs 200 of a forklift are aligned with the channels in the tubes 19. The forklift is then moved forward such that the prongs slide into the channels. As the forklift is raised, the tube 19 is engaged to the prongs such that there is little danger that the container will tilt or fall off the forklift. This permits the forklift operator to work more swiftly and confidently, thus saving time loading the containers.

When the container has been shipped to its desired location, the door 15 is moved along in the tracks 14 until the door opening 23 is aligned with the bottom opening 13 of the base 10. The flexible liner 210 is cut to allow the bulk material to flow freely. Alternatively, a cutting edge can be supplied on the door which will cut the flexible liner as the door is moved to an open position. The concave shape of the base 10 causes the bulk material to flow towards the bottom opening 13. Thus, the material is less likely to collect inside the container 1.

Once empty, the flexible liner 210 is removed from the container 1. The bottom latches 21 are released. The handles 34, 35 are grasped and the sleeve 30 is pulled up, out of the ledge 16 of the base 10. The plates 31 can then be folded together, with the internal hinges 33 at the outer ends, to form a relatively flat, folded sleeve. The external hinges open to about 180° while the internal hinges are closed to about 360°. The plates 31 of the two side members 37 are thus brought adjacent to one another. The folded sleeve takes up less space in a truck or train compartment when being shipped back to receive more bulk material.

While this invention has been described with reference to specific embodiments disclosed herein, it is not confined to the details set forth and the patent is intended to include modifications and changes which may come within and extend from the following claims.

I claim:

1. A container for the storage and shipping of bulk solids comprising:
    a base having a polygonal profile including a selected number of panels connected to form an inverted pyramid with a top and a bottom, wherein the top of the base is in a top plane and the panels are connected to form a lower opening at the bottom of the base;
    a shelf fixedly mounted to the base at the top;
    a rigid ledge, having the selected number of sides, a band shape and a selected height, fixedly connected to and surrounding the top of the base;
    legs attached to the base and extending a fixed distance from the base in a direction away from the top of the base;
    tubes fixedly mounted to the legs distal to the base and extending parallel to the top plane;
    means for selectively blocking the lower opening at the bottom of the base;
    a sleeve selectively engaged to the base, the sleeve including a series of the selected number of rigid structural plates, each structural plate including at least a bottom edge, the bottom edges of the structural plates being disposed on the shelf along the ledge, each structural plate being attached to two adjacent structural plates by hinges, wherein the hinges are ordered around the sleeve: at least one external hinge, at least one internal hinge, at least one external hinges, at least one internal hinge; and
    means for engaging the structural plates to the base.

2. The container of claim 1 wherein each structural plate comprises a first longitudinal end, a second longitudinal end and a top edge, wherein the first longitudinal edge of one structural plate is attached to the second longitudinal edge of an adjacent structural plate by a hinge extending substantially the entire length of the first longitudinal edge of the first structural plate.

3. The container of claim 2 wherein each hinge is distinct from the structural plate and comprises a first hinge plate and a second hinge plate connected by a pivot, wherein the first hinge plate is attached to the first longitudinal edge of one structural plate and the second hinge plate is attached to the second longitudinal edge of an adjacent structural plate.

4. The container of claim 2 wherein the selected number is eight and the base has an octagonal profile, and wherein the hinges are ordered: three external hinges, one internal hinge, three external hinges, one internal hinge.

5. The container of claim 4 further comprising latches mounted to the ledge for selective locking engagement to the structural plates of the sleeve.

6. The container of claim 1 wherein the structural plates are made of a puncture-resistant material with substantial compressive and tensile strength.

7. The container of claim 1 further comprising a lid mounted to the sleeve distal to the base wherein the sleeve can support the weight of a second container positioned on the lid.

8. The container of claim 1 further comprising a door slidingly mounted to the base at the bottom and movable from a first position in which the door covers the lower opening to a second position in which the lower opening is exposed.

9. A reusable container for the storage, shipping and delivery of bulk, flowable materials comprising:
    a base having a top opening, a bottom opening and a funnel shaped top surface leading from the top opening to the bottom opening;
    means for receiving fork lift prongs mounted to the base at a fixed position with respect to the bottom opening;
    means for selectively closing the bottom opening;
    a sleeve selectively mounted to the base about the top opening;
    wherein the sleeve comprises a plurality of rigid plates each plate hinged to two adjacent plates such that the flow of bulk material between adjacent plates is restricted; and
    means for selectively securing the sleeve to the base;
    wherein the means for receiving fork lift prongs comprises tubes mounted to the base by legs, wherein a portion of the tubes is further distal to the top opening than the bottom opening is distal to the top opening;
    and wherein the sleeve comprises:
        a first member having two side ends and including a selected number of rigid structural plates connected by external hinges; and
        a second side member having two side ends and including the same number of rigid structural plates as the first side member, which rigid structural plates are connected by external hinges;
    wherein the side ends of the first member are connected to the side ends of the second member by internal hinges.

10. A container for storing and transporting bulk solid materials comprising:
    a rigid based having a top surface with a periphery and a bottom; and
    a sleeve having an interior and an exterior, which sleeve is selectively engaged to the base, the sleeve comprising:
    a first side member having two side ends and including a first selected number of rigid structural plates connected by external hinges; and
    a second side member having two side ends and including a second selected number of rigid structural plates connected by external hinges;
    wherein the first side member and the second side member are connected along the side ends by internal hinges to form the sleeve;
    wherein the sleeve can be moved from an open position, in which the rigid structural plates are separated to form a cavity between the rigid structural plates, to a folded position in which the structural plates of the first side member are adjacent the structural plates of the second side member;
    wherein the sleeve fits snugly within the periphery of the base when the sleeve is in the open position;
    and wherein the top surface of the base has a funnel shape and an opening is disposed in the bottom of the base.

11. The container of claim 10 further comprising parallel tubes mounted to the base and adapted to receive prongs of a fork lift.

12. A container for storing and transporting bulk solid materials comprising:
- a rigid based having a top surface with a periphery and a bottom; and
- a sleeve having an interior and an exterior, which sleeve is selectively engaged to the base, the sleeve comprising:
  - a first side member having two side ends and including a first selected number of rigid structural plates connected by external hinges; and
  - a second side member having two side ends and including a second selected number of rigid structural plates connected by external hinges;
  - wherein the first side member and the second side member are connected along the side ends by internal hinges to form the sleeve;
  - wherein the sleeve can be moved from an open position, in which the rigid structural plates are separated to form a cavity between the rigid structural plates, to a folded position in which the structural plates of the first side member are adjacent the structural plates of the second side member;
  - wherein the sleeve fits snugly within the periphery of the base when the sleeve is in the open position;
  - and wherein adjacent structural plates of the first side member are separated by a predetermined distance such that, when the sleeve is in the open position, the adjacent plates are in contact, thereby forming a seam.

13. The container of claim 12 wherein the structural plates have a length and the hinges extend along substantially the entire length on the structural plates.

* * * * *